United States Patent
Stewart et al.

(10) Patent No.: US 7,027,479 B2
(45) Date of Patent: Apr. 11, 2006

(54) VOLUME ABSORBING LASER BEAM DUMP

(75) Inventors: Alan F. Stewart, Camarillo, CA (US); Rashmi S. Shah, Simi Valley, CA (US); Gregory M. Yagiela, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 10/726,777

(22) Filed: Dec. 3, 2003

(65) Prior Publication Data

US 2005/0123019 A1 Jun. 9, 2005

(51) Int. Cl.
*H01S 3/08* (2006.01)
(52) U.S. Cl. .......................... 372/108; 372/99; 372/98; 372/11
(58) Field of Classification Search ................ 372/108, 372/11, 99, 98
See application file for complete search history.

(56) References Cited

U.S. PATENT DOCUMENTS

| | | | | |
|---|---|---|---|---|
| 4,195,225 | A * | 3/1980 | Karamian | 250/373 |
| 4,371,897 | A * | 2/1983 | Kramer | 358/474 |
| 5,917,185 | A * | 6/1999 | Yeung et al. | 250/288 |
| 6,362,453 | B1 * | 3/2002 | Wang et al. | 219/121.69 |
| 2004/0207852 | A1 * | 10/2004 | Bechtel et al. | 356/440 |
| 2005/0241568 | A1 * | 11/2005 | Sasaki et al. | 117/68 |

* cited by examiner

*Primary Examiner*—Minsun Oh Harvey
*Assistant Examiner*—Delma R. Flores-Ruiz
(74) *Attorney, Agent, or Firm*—Jonathan W. Hallman; MacPherson Kwok Chen & Held

(57) ABSTRACT

A volume-absorbing laser beam dump encloses a solution comprising a laser-absorbing solute diluted in a solvent that is non-absorbent of the laser energy. The laser beam dump includes a window to admit a laser beam into the solution. As the laser beam travels through the solution, the diluted solute absorbs the laser energy.

26 Claims, 4 Drawing Sheets

VOLUME ABSORBING LASER BEAM DUMP

STATEMENT REGARDING FEDERALLY SPONSORED RESEARCH OR DEVELOPMENT

This invention was made with Government support under contract number F29601-97-C-0001 awarded by the U.S. Air Force. The Government has certain rights in this invention.

TECHNICAL FIELD

This invention relates generally to lasers, and more particularly to a volume absorbing laser beam dump for a laser beam.

BACKGROUND

While in use, a laser beam is directed at the desired workpiece. For example, in laser welding, the workpiece would be the material being welded. There are periods, however, when laser beams are activated but are not directed at the workpiece, such as during laser beam alignment. Because laser beams can injure eyes and damage surrounding hardware during such periods, they must be captured and appropriately terminated in a laser beam dump. The use of a laser beam dump is particularly important in high-energy laser applications, given the potential damage high-energy laser beams can inflict on equipment and personnel.

One type of laser beam dump suitable for high-energy applications (such as kilowatt or megawatt laser output) includes a conical copper reflector within a cylindrical copper housing. The interior of the cylindrical copper housing is coated with absorbent material such as carbon or graphite so that laser energy reflected from the conical copper reflector is absorbed by the laser beam dump. After sustained use, the copper reflector and/or the laser beam dump surfaces may exhibit surface temperatures of several hundred degrees Celsius such that forced air or water cooling of the laser beam dump through cooling channels may be necessary.

The resulting weight of the required amount of copper and cooling apparatus makes copper laser beam dumps relatively heavy, making their use in certain applications problematic. For example, a relatively heavy laser beam dump is undesirable in airborne applications. Moreover, diffuse backscatter of laser energy from the copper reflector and the dump surfaces leads to the propagation of laser energy in unwanted directions. Such unwanted laser energy propagation is undesirable in low power and high power applications where the signal-to-noise ratio in associated detectors is important.

Accordingly, there is a need in the art for light-weight laser beam dumps that can terminate high-energy laser beams with a minimal amount of backscatter.

SUMMARY

In accordance with one aspect of the invention, a laser beam dump for a high-energy laser beam is provided that includes a housing enclosing a solution, wherein the solution comprises a solute that is absorbent at the wavelength of the high-energy laser beam and is diluted in a solvent that is not absorbent at the wavelength of the high-energy laser beam. The housing includes an aperture sealed by a window configured such that the high-energy laser beam may pass through the window into the solution. Because the solute is diluted in the non-absorbing solvent, laser energy is safely absorbed throughout the volume of solution within the laser beam dump without substantial vaporization of the solution.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
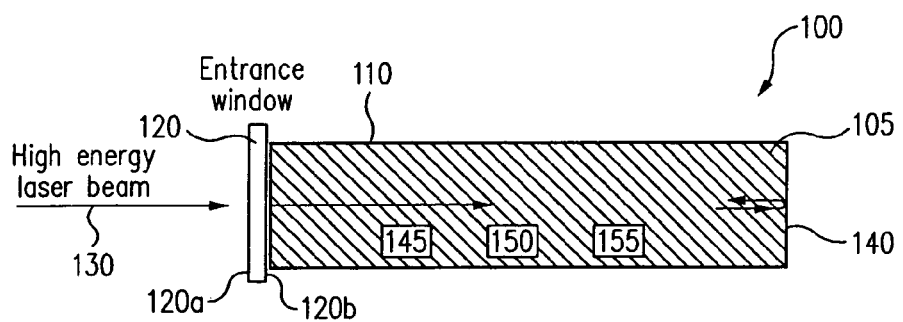
FIG. 1 is a longitudinal cross-sectional view of a laser beam dump according to an embodiment of the invention.

FIG. 1 is a block diagram for an exemplary embodiment of a laser beam dump 100. Laser beam dump 100 includes a closed housing 110 containing a solution 105. Housing 110 may be cylindrical or any other desired shape such as rectangular or spherical. A laser-energy-absorbing solute dissolved by a solvent forms solution 105. When exposed to a high-energy laser beam 130 which passes into solution 105 through a window 120, the laser-energy-absorbing solute may heat up very rapidly due to the relatively large amounts of energy that can be absorbed from such a high-energy laser beam. As a consequence, the laser-energy absorbing solute may vaporize, leading to rupture of housing 110. Thus, the solvent is selected such that it does not absorb or absorbs a relatively small amount of laser energy in comparison to the solute.

By keeping the solute/solvent ratio relatively small, i.e., by keeping the solute relatively diluted by the solvent, laser beam 130 will be absorbed gradually as it passes through solution 105. On the other hand, as the concentration of the solute is increased in solution 105, the relative energy absorption rate is increased. If a high-energy laser beam is absorbed in such a relatively concentrated solution, the danger of vaporization is increased. For example, a pure water solution will absorb a significant fraction of the incident power when exposed to a high-energy laser beam having a wavelength of 1315 nm. The amount of energy thus absorbed may be so large that as a high-energy laser beam 130 passes through window 120 into a solution 105 comprised of pure water, vaporization and boiling would occur immediately at a window/solution interface 120b of window 120. Thus, the solute should be diluted sufficiently in solution 105 to protect against this danger. Because of this dilution, absorption occurs throughout the volume of solution 105 rather than through vaporization at window/solution interface 120b. In this fashion, laser beam dump 100 may be denoted as a volume-absorbing laser beam dump.

The selection of a solvent that is relatively transparent to a laser beam depends upon the laser's wavelength. Because all solvents may present some minimal or trace amount of absorption to the desired laser beam wavelength, as used herein, a solvent will be denoted as being "not absorbent" when the amount of absorption it provides is insubstantial with respect to the chosen solute. For example, the solvent's level of absorption should be at least an order of magnitude less than the solute, and more preferably, at least two orders of magnitude less than the solute's level of absorption.

The selection of a laser-energy absorbing solute also depends upon the wavelength of laser beam 130. For example, solutes having an oxygen-hydrogen (OH) bond exhibit an optical absorption band centered near 1380 nm. Such solutes would be useful for absorbing laser light having a wavelength of, for example, 1315 nm. Numerous compounds are suitable for such absorption such as water, ethanol, methanol (and other alcohols), and ethylene glycol. The solvent should dissolve the chosen solute and also be transparent to the desired laser beam wavelength. In general, solutes may be either polar or non-polar. Following the principle that "like dissolves like," the solvent should possess the same polarity. In other words, if the solute is non-polar, the solvent should also be non-polar. Similarly, if the solute is polar, the solvent should also be polar. There are exceptions to this general rule, however. For example, a solvent may possess both polar and non-polar moieties such that it may dissolve both polar and non-polar solutes.

In the following examples, the solute will be selected to absorb laser light having a wavelength of 1315 nm. Similarly, the solvent will be selected so that it is not absorbent to laser light having a 1315 nm wavelength. It will be understood, however, that the wavelength being absorbed may be any suitable laser wavelength and is not limited to 1315 nm. As discussed above, solutes that are absorbent at a 1315 nm wavelength include water, ethanol, methanol (and other alcohols), and ethylene glycol. Choosing water as the solute from this group is particularly convenient as it is inexpensive, non-toxic, and non-flammable. Because water molecules are polar, should water be the chosen solute, a polar solvent such as acetone, deuterated water, or carbon disulfide are all transparent to laser light having a wavelength of 1315 nm. From this group of potential solvents, different factors may make one solvent preferable over others. For example, cost pressures may eliminate the use of relatively-costly deuterated water. In addition, environmental concerns may favor the selection of flammable acetone over the use of environmentally-toxic carbon disulfide as the solvent for water within solution 105, even though carbon disulfide is non-flammable. The solute and solvent used to form solution 105 in the following examples will be thus assumed to be water and acetone, respectively.

However, it will be appreciated that the solute/solvent selection is not limiting and depends upon the wavelength of laser light being absorbed. Moreover, regardless of the particular laser wavelength, numerous solute/solvent combinations are suitable. One of ordinary skill in the art may consult chemical treatises to determine whether a potential solute is sufficiently absorbent at the laser wavelength being implemented. Similarly, one of ordinary skill in the art may consult these chemical treatises to determine whether a potential solvent is sufficiently non-absorbent at the laser wavelength being implemented.

Referring again to FIG. 1, window 120 at one end of housing 110 admits a high-energy laser beam 130. Suitable materials for window 120 that are transparent to laser light include sapphire and fused silica. Laser beam 130 propagates through solution 105 and is continually absorbed by the laser-energy absorbing solute. The length of the propagation path determines the amount of laser energy that is absorbed. To increase the effective propagation path length, a mirror 140 may be located at an opposing end of housing 110 to reflect laser light that has traversed the length of housing 110 back towards window 120. Regardless of whether laser beam dump 100 includes mirror 140, the length of the propagation path taken by laser beam 130 through solution 105 determines the amount of laser energy absorption. To promote volume absorption along this propagation path, the relative concentration of the laser-energy-absorbing solute with respect to the non-absorbent solvent may be chosen accordingly. For example, if solution 105 comprises a diluted water solution such as 1.25% water in acetone, the energy absorption rate is greatly reduced. Thus, high-energy laser beam 130 can propagate through solution 105 until completely attenuated without the solution being vaporized.

As laser beam 130 propagates through solution 105, its intensity decays exponentially in accordance with Beer's law. For example, if x is the distance in centimeters of the propagation path taken by laser beam 130 through solution 105, the intensity P of laser beam 130 as a function of distance x is described through Beer's law as:

$$P(x)=P(0)e^{-\alpha x}$$

where $\alpha$ is the absorption coefficient in $cm^{-1}$ and P(0) is the intensity of laser beam 130 as it passes through window 120 at window/solution interface 120b. Depending upon the desired application, the concentration of water in solution 105 is varied. If no polar solvent is included, $\alpha$ will be that for pure water (1.3 $cm^{-1}$ at 1315 nm wavelength). As the concentration of water is decreased, the value of $\alpha$ will decrease accordingly. For example, if the water concentration is 10%, the value of $\alpha$ is 1/10th that of pure water.

Figure 2:
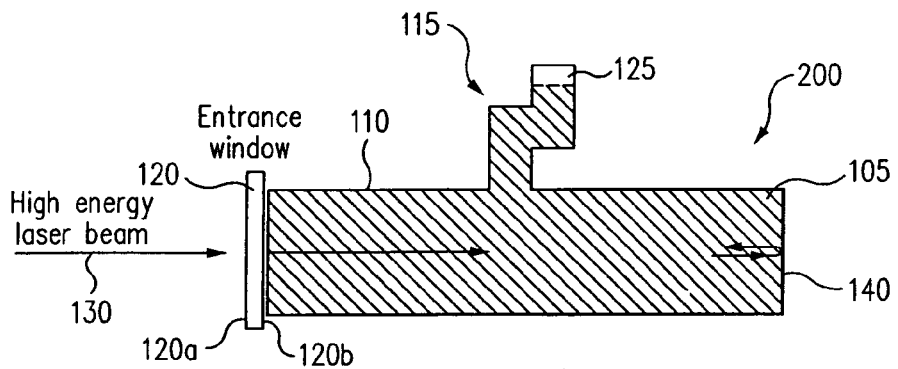
FIG. 2 is a longitudinal cross-sectional view of a laser beam dump having an optional pressure-release fitting according to another embodiment of the invention.

As solution 105 absorbs laser energy and heats up, it will expand to some degree. To prevent rupture of housing 110 in response to this expansion, a bubble of gas may be captured within housing 110. As solution 105 expands, this bubble would be compressed and accommodate the expansion without danger of rupture. To prevent laser beam 130 from passing through the bubble, a pressure-release fitting 115 may be attached to housing 110 for a laser beam dump 200 as shown in FIG. 2. Pressure-release fitting 115 may be configured with a "dogleg" to trap a bubble 125 of an added gas. Ordinary air may be used to form bubble 125 or an inert gas such as, for example, nitrogen may be used.

If laser beam dump 100 includes mirror 140, the effective propagation length of laser beam 130 through solution 105 is doubled. Because laser beam 130 propagates in straight lines, the length of housing 110 determines the achievable propagation length. For example, if housing 110 is 1 meter in length and includes mirror 140, the achievable propagation length is 2 meters. Of course, it will be appreciated that the goal of a laser beam dump is to terminate the received laser beam. As such, the concentration of the laser-absorbing solute is chosen to achieve effective termination of laser beam 130 as it propagates along the achievable propagation path. For example, if the achievable propagation length is 2 meters, the solute concentration should be selected to achieve termination of laser beam 130 before it has propagated 2 meters through solution 105. However, the solute concentration choice is also driven by the desire to avoid vaporization of solution 105. Thus, the solute concentration cannot be arbitrarily increased to ensure termination of laser beam 130. It may be that the length of housing 110 must also be increased to avoid the need for a relatively high solute concentration. A tradeoff may be made between the desires of decreasing the dimensions of housing 110 (and thereby requiring a relatively greater solute concentration) and avoiding vaporization by diluting the solute (and thereby requiring larger housing dimensions to provide a larger propagation path).

Figure 3:
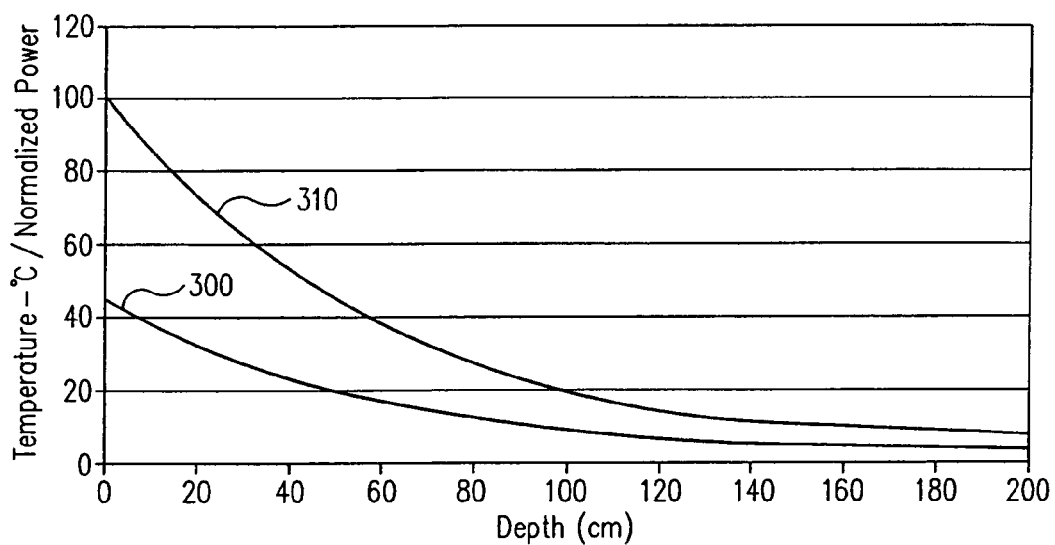
FIG. 3 is a graphical representation of the temperature profile and normalized power within the laser beam dump of FIG. 1.

Although the propagation path length determines the amount of energy absorbed as governed by Beer's law, other factors affect the dimensions of housing 110. For example, although laser beam 130 travels along a defined propagation path in solution 105, the total volume of solution 105 retained by housing 110 acts as a heat sink to keep the maximum achieved temperature increase in solution 105 relatively low. The total volume of solution 105 is typically many times larger than the fairly-limited volume within the propagation path for laser beam 130. Thus, the dimensions of housing 110 should accommodate not only a sufficient propagation path but also a sufficient total volume of solution 105. For a laser beam of known power level and a limited duration, the length and width of housing 110 and the concentration of water may be chosen to achieve a desired maximum temperature within the solution such that solution 105 is adequately protected from boiling. For example, for a 3 mega joule laser beam power over a two second duration at a 1315 nm wavelength, solution 105 will be maintained below 50° C. if the length of housing 110 is 2 meters (in a mirror-containing embodiment), the width (assuming a circular cylindrical design) is 36 centimeters, and the water concentration is 1.25%. The resulting temperature profile as a function of depth within laser beam dump 100 as measured from window 120 is shown in FIG. 3 with a line 300. Also illustrated in FIG. 3 with a line 310 is the normalized power. The normalized power is normalized with respect to the incident power of laser beam 130 as it crosses through window/solution interface 120b. As can be seen from inspection of FIG. 3, the maximum temperature of solution 105, which does not exceed 50° C., occurs at window/solution interface 120b (as would be expected from Beer's law).

Because the interior surfaces of housing 110 are immersed in solution 105, laser-beam-induced heating of these surfaces is much less than would be encountered in the metal surface/air interfaces within a conventional laser beam dump. However, to maximize safety and durability of housing 110, the interior surfaces may be provided with reflective coatings, such as a specular reflective coating or a diffuse reflective coating as known to those of ordinary skill in the art, to promote absorption of laser energy within solution 105. In this fashion, should laser energy propagate to an interior surface of housing 110, it will be reflected back into solution 105 to continue attenuating.

Figure 4:
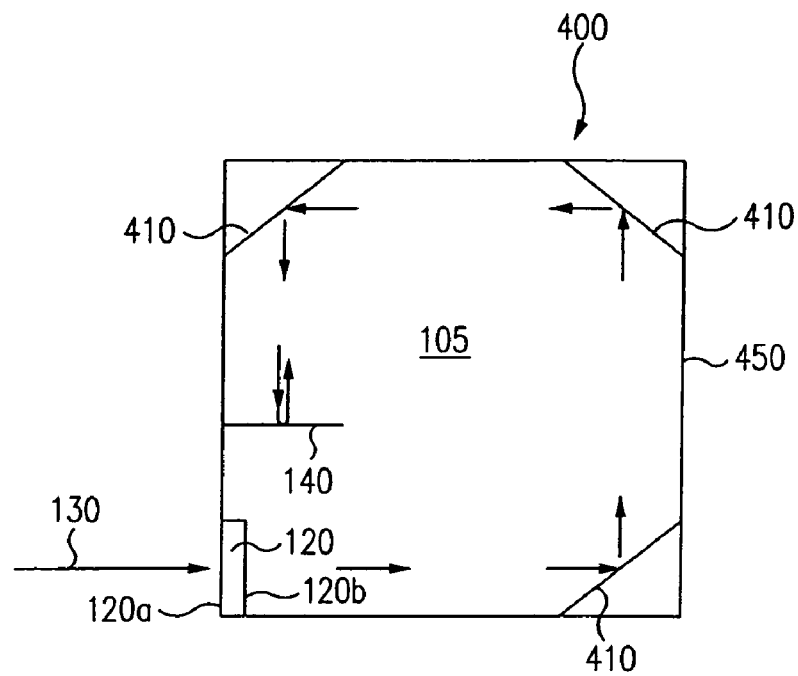
FIG. 4 is a cross-sectional view of a laser beam dump according to yet another embodiment of the invention.

While the invention has been described with respect to laser beam dump 100 of FIG. 1, one skilled in the art will appreciate that the volume-absorbing features of the invention are not limited to a laser beam dump wherein housing 110 is cylindrical. For example, a more compact design may be achieved by "coiling" the propagation path for laser beam 130 as seen in a laser beam dump 400 of FIG. 4. A housing 450 may thus have a square or rectangular shape or virtually any other closed shape suitable for a particular application or system. Laser beam 130 passes through window 120 into solution 105 to optional mirror 140, as discussed with respect to FIG. 1. However, a set of mirrors 410 is not optional because laser beam 130 no longer can take a linear path from window 120 to mirror 140. Laser beam 130 thus propagates through window 120 and is successively reflected off mirrors 410 until it reaches mirror 140. Reflecting off mirror 140, laser beam 130 may continue propagating back towards window 120, successively reflecting off mirrors 410 in reverse order. To provide an approximate 2 meter internal laser beam absorption path between window 120 and mirror 140 as discussed with respect to FIG. 1, each side of housing 450 would be approximately 60 centimeters. In this fashion, a 2 meter laser beam absorption path is provided without requiring a housing having a linear dimension of 2 meters.

Figure 5:
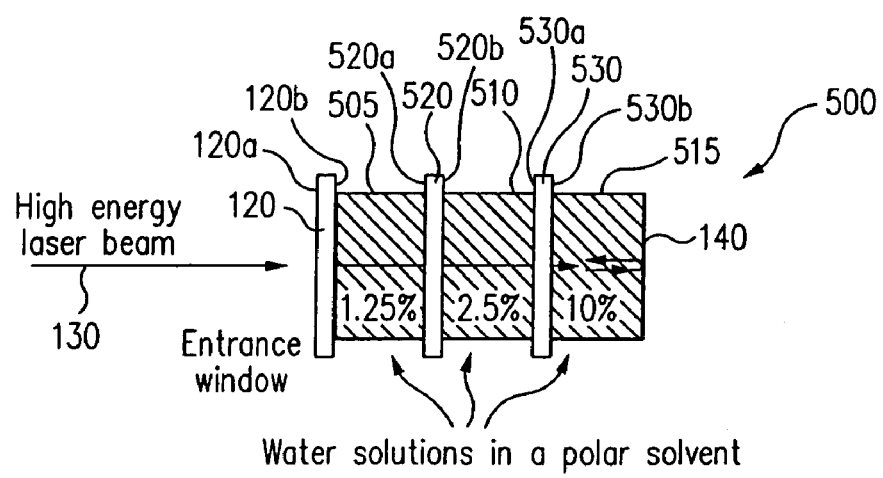
FIG. 5 is a longitudinal cross-sectional view of a laser beam dump having multiple housings according to yet another embodiment of the invention.

As discussed with respect to Beer's law, the intensity of laser beam 130 drops off exponentially as it propagates through solution 105. Regardless of the housing shape, the majority of the laser power is thus absorbed near window/solution interface 120b. Because the intensity continues to decrease exponentially as laser beam 130 propagates into solution 105 and away from window/solution interface 120b, there is a corresponding decrease in energy absorption. This is seen in the temperature profile of FIG. 3 as well. To provide more uniform power absorption across the laser beam propagation path within solution 105, a volume-absorbing laser beam dump 500 having separate solutions of differing solute concentrations is shown in FIG. 5. Three housings 505, 510, and 515 are aligned end-to-end as shown. Each housing contains a solution of differing solute concentration. It will be appreciated, however, that the number of housings (and hence the number of differing solute concentrations) is not limited such that any number of housings may be utilized in this fashion.

In the following discussion the solute/solvent combination of laser beam dump 500 will be assumed to be water/acetone. However, it will be appreciated that the particular solute/solvent combination being used depends upon the wavelength of laser beam 130. The water concentration is progressively increased in the propagation direction of laser beam 130 as it travels from window 120 to mirror 140. Laser beam 130 enters housing 505 through window 120 as discussed with respect to FIG. 1. A dividing window 520 joins housings 505 and 510 so that the laser energy may pass through housing 510 to a window 530 that joins housings 510 and 515. In this fashion, laser beam 130 may pass through to optional mirror 140, reflect off mirror 140, and continue back through dividing windows 530 and 520 towards window 120. Analogous to window 120, suitable materials for dividing windows 520 and 530 include fused silica and sapphire.

Figure 6:
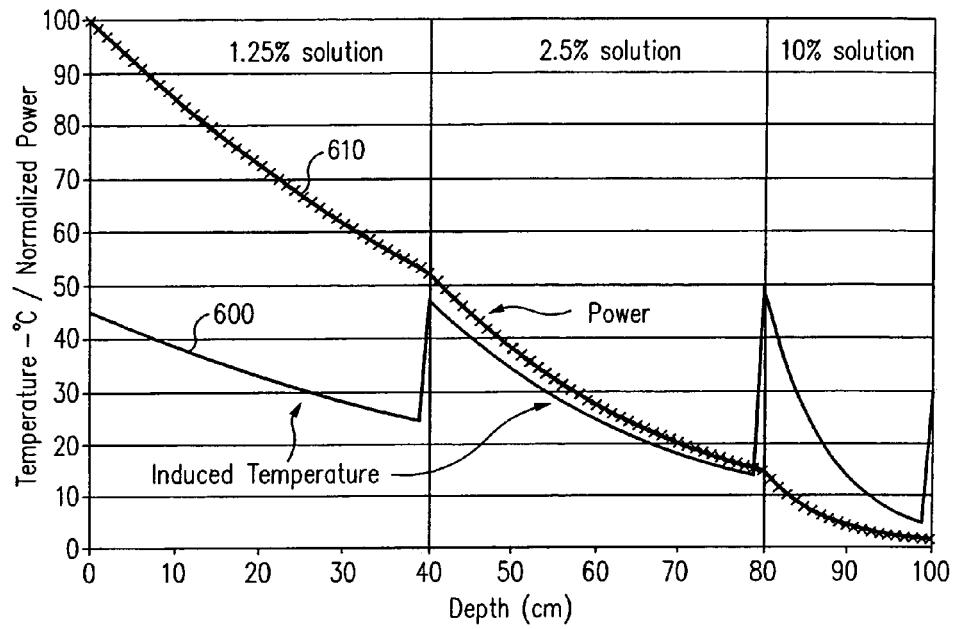
FIG. 6 is a graphical representation of the temperature profile and normalized power within the laser beam dump of FIG. 5.

The length of each housing and the water concentration in the solution it contains may be varied to equalize the energy absorption, as could be calculated by one skilled in the art. For example, to achieve the same amount of power absorption as discussed with respect to FIG. 3 without exceeding 50° C., housing 505 may have a length of 40 centimeters and contain a 1.25% water solution, whereas housing 510 may also have a length of 40 centimeters but contain a 2.5% water solution. Because the water concentration is greater within housing 510, the effective absorption coefficient $\alpha$ is greater than that achieved within housing 505. In turn, the amount of energy absorbed according to Beer's law is increased with respect to that achieved within housing 505. Finally, housing 515 may have a length of 20 cm and contain a 10% water solution. In this case, the effective absorption coefficient $\alpha$ is even greater, leading to an even greater energy absorption rate. The resulting temperature profile as a function of depth within laser beam dump 500 as measured from window 120 is shown in FIG. 6 using a line 600. Also illustrated in FIG. 6 is the normalized power using a line 610. The normalized power is normalized with respect to the incident power of laser beam 130 at window/solution interface 120b. Upon inspection of FIG. 6, it will be seen that the maximum temperature achieved in each housing is substantially the same and does not exceed 50° C. The uniformity of the maximum temperature results from having the laser power absorbed relatively uniformly in each housing.

Regardless of whether a laser beam dump as described herein is formed from a single housing or multiple housings, a possible concern is stratification of the solution(s) contained in the laser beam dump over long periods of time. This possible stratification results from the potentially different densities of the solute and the solvent. For example, water (solute) and acetone (solvent) have different densities and can separate over time. The resulting separation in solution 105 may lead to unexpected power absorption profiles within the laser beam dump such that localized boiling might occur. To prevent any stratification, a magnetic stirrer, agitator, pump, or other suitable mixing means 145 as illustrated in FIG. 1 may be used to promote mixing of the solution (as in FIG. 1) or solutions (as in FIG. 5) within the laser beam dump.

As discussed above, the water concentration and laser beam dump dimensions are designed to absorb a specific energy load delivered by a known power level for a limited duration. Should the high-energy laser beam be supplied continuously, a cooling system 150 may be included within the laser beam dump to actively cool the solution(s) as illustrated in FIG. 1. The cooling system may comprise piping (not illustrated) which does not intercept the laser beam as it travels through the solution(s). A cooling solution such as chilled water or Freon would be pumped through the piping to actively cool the solution(s).

In other embodiments of the invention, a temperature measuring device 155 such as, for example, a thermocouple or a resistance temperature detector may be added to the solution(s) contained within the laser beam dump as illustrated in FIG. 1. The measured temperature increase may be used to derive the absorbed power and thus the total incident beam power may also be calculated as will be appreciated by those of ordinary skill in the art. The total incident beam power may then be used to calibrate other sensors outside of laser beam dump 100. For example, a system may split off a low-power beam from laser beam 130 before it passes through window 120 into solution 105 and employ sensors to measure this low-power beam. The absolute calibration of these sensors may then be achieved from the total incident beam power derived through temperature measurements using temperature measuring device 155.

Note that the achievable weight reductions with respect to prior art laser beam dumps provided by the present invention are quite significant. For example, the weight of the 1.25% water solution needed to fill laser beam dump 100 described with respect to FIG. 1 is approximately 200 kg. The weight of the solutions to fill laser beam dump 400 described with respect to FIG. 5 is approximately 100 kg. The total projected maximum temperature for either device is 50° C. when subjected to a 3 mega joule laser beam for two seconds. To achieve the same maximum temperature using a prior art copper laser beam dump, the required mass of copper is 155 kg. But note that the 155 kg figure assumes a uniform temperature throughout the copper mass. In fact, a copper laser beam dump will not be uniformly heated by a high-energy laser beam because of the surface absorption it employs. Instead, typical copper laser beam dumps exhibit surface temperatures of several hundred degrees Celsius. Such high surface temperatures lead to the potential for flying debris from the copper surface and attendant risk to personnel from the flying copper debris. As such, copper laser beam dumps generally require refrigeration systems that add significant amounts of weight such that the volume-absorbing laser beam dumps described herein may offer dramatic weight reductions.

Although the laser beam dump embodiments described so far are relatively lightweight, reflection or backscatter is always a concern in the vicinity of high-energy laser beams. For example, with regard to window 120 of FIGS. 1, 2, 4, and 5, backscatter or reflection will occur at both the air/window interface 120a and window/solution interface 120b. Similarly, backscatter from windows 520 and 530 (FIG. 5) occurs at the window/solution interfaces 520a, 520b, 530a, and 530b.

A "V" type antireflection ("VAR") coating, as is known in the art, may be used to reduce this backscatter and depends upon the type of interface, i.e., whether it is an air/window interface or a window/solution interface. For air/window interface 120a, a "V" coating having two layers may reduce reflections to a few parts per million. Each part per million represents one-millionth of the incident laser beam energy. The nature of the "V" coating also depends upon the composition of windows 120, 520, and 530. For example, assuming window 120 comprises fused silica, a two-layer "V" coating may be used. A first coating layer of $Ta_2O_5$ (tantalum pentoxide) having a thickness of 266.3 nm may be deposited on the fused silica surface at interface 120a. Upon this first coating layer, a second coating layer of $SiO_2$ (silicon dioxide) having a thickness of 153.92 nm may be deposited.

Figure 7:
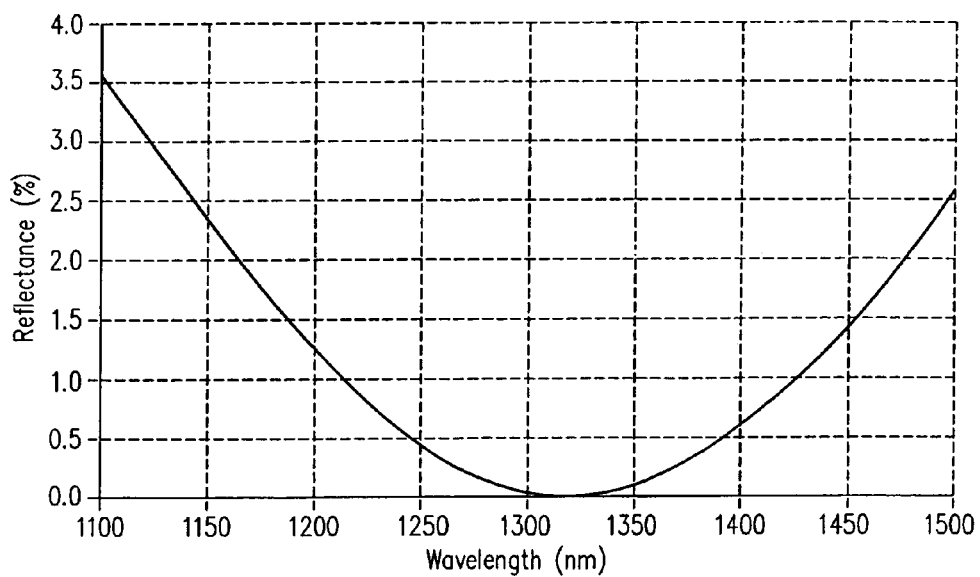
FIG. 7 is a graphical representation of the reflectance vs. wavelength for an antireflection coating on an air/window interface of FIGS. 1, 2, 4, and 5.

As seen in FIG. 7, the expected reflectance of this two-layer VAR coating at 1315 nm wavelength is at near 0% reflectance for a laser beam normally incident upon interface 120a. More specifically, analysis has shown the reflectance to be less than 5 ppm, where 10000 ppm corresponds to a 1.0% reflectance. In general, it will be appreciated by those of ordinary skill in the art that the construction of the antireflection coating for the air/window interface depends upon the wavelength of the laser beam being attenuated and the material used to construct the window. For example, similar coating designs are possible when utilizing sapphire as a window material in place of fused silica.

Figure 8:
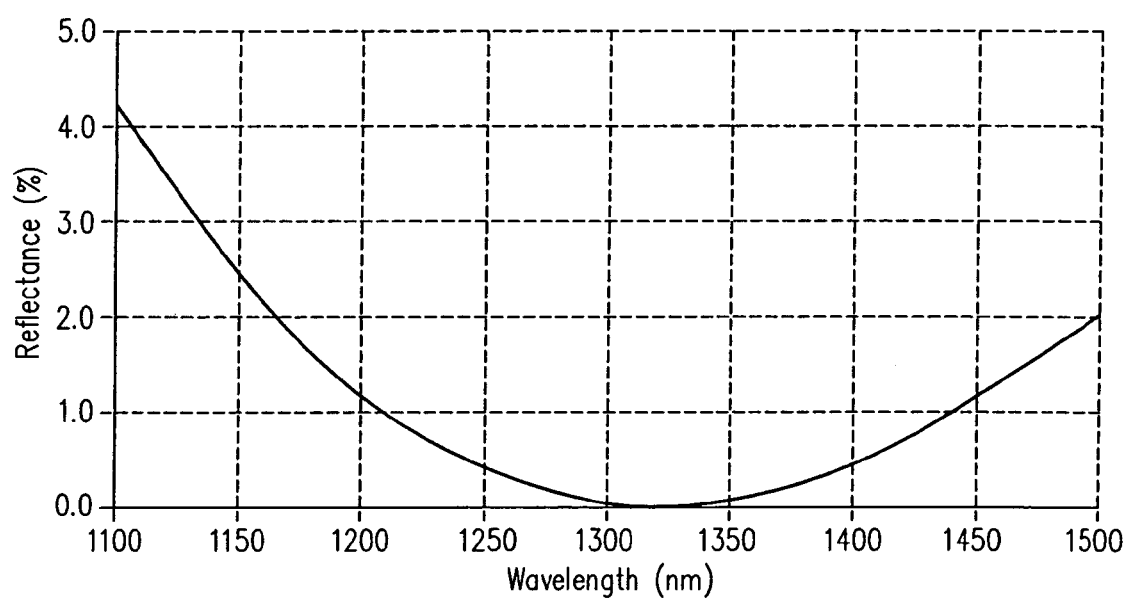
FIG. 8 is a graphical representation of the reflectance vs. wavelength for an antireflection coating on a window/solution interface of FIGS. 1, 2, 4, and 5.

For those window surfaces immersed in solution, a slightly different VAR coating may be used. For example, assuming that windows 120, 520, and 530 each comprises fused silica, a two-layer VAR coating may be formed as follows on the window surfaces at window/solution interfaces 120b, 520a, 520b, 530a, and 530b. A first coating layer of $Ta_2O_5$ having a thickness of 302.9 nm may be deposited on the corresponding fused silica surfaces. Upon this first coating layer, a second coating layer of $SiO_2$ having a thickness of 129.81 nm may be deposited. As seen in FIG. 8, the expected reflectance of this two-layer VAR coating at 1315 nm wavelength is also near 0% reflectance for a normally incident laser beam. Analysis has shown a reflectance of less than 15 ppm in this example, again with 10000 ppm corresponding to 1.0% reflectance. In general, it will be appreciated that the construction of the antireflection coating for the window/solution interface depends upon the wavelength of the laser beam being attenuated, the material used to construct the window, and the solution composition. Having the appropriate VAR coatings on windows 120, 520, and 530 in laser beam dump 500 of FIG. 5, it is reasonable to expect that the overall backscatter would be less than 100 ppm.

Backscatter from windows 120, 520, and 530 will generally be specular and highly directional. Thus, unwanted reflections may be safely attenuated in a secondary low-power laser beam dump. In contrast, the backscatter from the absorbing carbon or graphite material in conventional copper laser beam dumps is diffuse and strongly dependent on the surface condition of the absorbing material. Low-power backscatter from such surfaces is difficult to control, spreading reflected laser energy in unwanted directions. This spread of laser energy may make low-light-level applications and operation of low-light-level sensors outside of the laser beam dump problematic. The volume-absorbing laser beam dumps described herein may offer the advantage of complete disposal of laser light in a controlled fashion.

Accordingly, although the invention has been described with respect to particular embodiments, this description is only an example of the invention's application and should not be taken as a limitation. Consequently, the scope of the invention is set forth in the following claims.

We claim:

1. A laser beam dump, comprising:
a housing, wherein the housing includes a first window; and
a solution contained within the housing, wherein the solution comprises a solute that is absorbent at the wavelength of a laser beam and a solvent that is not absorbent at the wavelength of the laser beam, and wherein the first window is configured such that the laser beam may pass through the first window into the solution.

2. The laser beam dump of claim 1, wherein the housing contains a plurality of mirrors arranged from a first mirror to a last mirror, the mirrors being arranged such that the laser beam may pass through the first window and then be sequentially reflected by the mirrors starting from the first mirror and continuing to the last mirror and then back again in reverse sequence to the first mirror.

3. The laser beam dump of claim 1, wherein the housing defines a cylinder having a first end and an opposing second end and wherein the aperture is in the first end of the cylinder.

4. The laser beam dump of claim 1, wherein the housing contains a mirror, the mirror being configured to reflect laser light towards the first window.

5. The laser beam dump of claim 1, wherein the housing is divided into a plurality of sections, from a first section including the first window to a last section, each section enclosing a separate volume of the solution and being separated from the remaining sections by dividing windows such that the laser beam may pass through the first window and through the dividing windows.

6. The laser beam dump of claim 5, wherein the concentration of the solute is different for each section, the concentration being most dilute in the first section and progressively stronger in the succeeding sections, the variation of the concentrations being selected such that the absorption of laser energy in each section is approximately equal.

7. The laser beam dump of claim 6, further comprising an end window in the last section, the end mirror configured to reflect the laser beam towards the first window.

8. The laser beam dump of claim 7, wherein the solute is selected from the group consisting of water, ethanol, methanol, and ethylene glycol.

9. The laser beam dump of claim 8, wherein the solute is water and the solvent is selected from the group consisting of acetone, deuterated water, and carbon disulfide.

10. The laser beam dump of claim 9, wherein the first window and the dividing windows each comprises sapphire.

11. The laser beam dump of claim 9, wherein the first window and the dividing windows each comprise fused silica and are coated with anti-reflective coatings.

12. The laser beam dump of claim 11, wherein the interior of the housing is coated with a reflective coating.

13. The laser beam dump of claim 12, wherein the first window includes a first anti-reflective coating for its exterior surface adapted to minimize reflections from an air/silica interface and a second anti-reflective coating for its interior surface adapted to minimize reflections from a silica/solution interface and wherein each dividing window is coated with the second anti-reflective coating.

14. The laser beam dump of claim 12, wherein each section includes a temperature sensing device.

15. The laser beam dump of claim 12, further comprising a pressure-release fitting attached to the housing and in fluid communication with the solution, the pressure-release fitting enclosing a volume of gas to accommodate expansion of the fluid.

16. The laser beam dump of claim 15, wherein the volume of gas comprises an inert gas.

17. The laser beam dump of claim 15, wherein the volume of gas comprises air.

18. A method, comprising:
providing a solution including a laser-light-absorbing solute diluted in a non-laser-light-absorbing solvent; and
transmitting a laser beam through the solution, wherein the concentration of the solute is such that the laser beam is effectively terminated in the solution and the solution does not vaporize during this termination.

19. The method of claim 18, wherein the solution is contained in a cylinder having a mirror, the method further comprising reflecting the laser beam off the mirror to increase the laser beam path length taken within the solution.

20. The method of claim 18, further comprising cooling the solution.

21. The method of claim 18, further comprising agitating the solution.

22. The method of claim 18, further comprising measuring the temperature of the solution.

23. A laser beam dump for absorbing a high-energy laser beam, comprising:
a housing enclosing a solution, wherein the solution comprises water diluted in a polar solvent that is not absorbent at the wavelength of the high-energy laser beam, the housing including an aperture; and
a window sealing the aperture, wherein the window is configured such that the high-energy laser beam may pass through the window into the solution.

24. The laser beam dump of claim 23, wherein the housing defines a cylinder, and wherein the aperture is in a first end of the cylinder and wherein the housing contains a mirror at an opposing second end, the mirror being configured to reflect laser light towards the window.

25. The laser beam dump of claim 23, wherein the concentration of water and the volume of the solution are chosen such that the temperature of the solution does not exceed 50° C. during use.

26. The laser beam dump of claim 23, wherein the housing includes an agitator to stir the fluid.

* * * * *